(12) United States Patent
Rubin

(10) Patent No.: US 10,984,321 B1
(45) Date of Patent: Apr. 20, 2021

(54) SOLVING NP-HARD PROBLEMS THROUGH HEURISTIC ACQUISITION AND REUSE

(71) Applicant: SPAWAR Systems Center Pacific, San Diego, CA (US)

(72) Inventor: Stuart H. Rubin, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 947 days.

(21) Appl. No.: 15/652,074

(22) Filed: Jul. 17, 2017

(51) Int. Cl.
*G06N 3/12* (2006.01)
*G06N 20/00* (2019.01)
*G06F 21/55* (2013.01)

(52) U.S. Cl.
CPC ............. *G06N 3/126* (2013.01); *G06N 20/00* (2019.01); *G06F 21/55* (2013.01); *G06F 2221/034* (2013.01)

(58) Field of Classification Search
CPC ........ G06N 3/126; G06N 20/00; G06F 21/55; G06F 2221/034
See application file for complete search history.

(56) References Cited

U.S. PATENT DOCUMENTS

| | | | |
|---|---|---|---|
| 6,418,398 B1 * | 7/2002 | Dueck | H04L 45/14 702/181 |
| 8,155,949 B1 | 4/2012 | Rubin | |
| 8,250,022 B1 | 8/2012 | Rubin | |
| 8,280,831 B1 | 10/2012 | Rubin | |

(Continued)

OTHER PUBLICATIONS

Elsayed, Saber M., Ruhul A. Sarker, and Daryl L. Essam. "Self-adaptive differential evolution incorporating a heuristic mixing of operators." Computational optimization and applications 54, No. 3 (2013): 771-790. (Year: 2013).*

(Continued)

*Primary Examiner* — Luis A Sitiriche
*Assistant Examiner* — Casey R. Garner
(74) *Attorney, Agent, or Firm* — Naval Information Warfare Center, Pacific; Kyle Eppele; James R. McGee

(57) ABSTRACT

A computational system for solving a non-deterministic polynomial problem, involving a parellel processor operable by a set of self-updatable executable instructions storable on a non-transient memory device and configuring the parallel processor to interface with an information acquisition program, heuristically acquire information, through the information acquisition program, via a first transference and a second transference, whereby heuristic information is acquired, parametrically evolve the heuristic information, whereby parametrically evolved heuristic information is provided, reuse the parametrically evolved heuristic information to further heuristically acquire information, whereby iterative parametrically evolved heuristic information is provided, and self-update the set of executable instructions based on the iterative parametrically evolved heuristic information, whereby a self-updated set of executable instructions is provided, whereby the self-updated set of executable instructions facilitates information transfer between any two otherwise mutually random domains, and whereby an optimal solution, corresponding to the non-deterministic polynomial problem, is provided.

20 Claims, 8 Drawing Sheets

(56) References Cited

U.S. PATENT DOCUMENTS

| | | | |
|---|---|---|---|
| 8,315,958 B1 | 11/2012 | Rubin et al. | |
| 9,396,441 B1 | 7/2016 | Rubin | |
| 9,436,912 B1 | 9/2016 | Rubin | |
| 2003/0084011 A1* | 5/2003 | Shetty | G06Q 10/047 706/13 |
| 2011/0040750 A1* | 2/2011 | Safra | G06Q 10/047 707/723 |
| 2019/0108289 A1* | 4/2019 | Klein | G06F 16/9024 |

OTHER PUBLICATIONS

Battarra, Maria, Temel Oncan, I. K. Altinel, Bruce Golden, Daniele Vigo, and E. Phillips. "An evolutionary approach for tuning parametric Esau and Williams heuristics." Journal of the Operational Research Society 63, No. 3 (2012): 368-378. (Year: 2012).*

Chaitin, G.J., "Randomness and Mathematical Proof," Scientific American, vol. 232, No. 5, pp. 47-62, May 1975.

Rubin, S.H., et al., "NNCS: Randomization and Informed Search for Novel Naval Cyber Strategies", Recent Advances in Computational intelligence in Defense and Security, vol. 621, pp. 193-223, Dec. 20, 2015.

Rubin, S.H., "On Randomization and Discovery," Journal of Information Sciences, vol. 177, No. 1, pp. 170-191, Jan. 1, 2007.

Rubin, S.H., et al., "KASER: Knowledge Amplification Structured Expert Randomization," IEEE Transactions on Systems, Man, and Cybernetics, Part B (Cybernetics), vol. 34, No. 6, pp. 2317-2329, Dec. 6, 2004.

Einstein, Albert (1916), "Die Grundlage der allgemeinen Relativitätstheorie," Annalen der Physik, 49: 769-822, Bibcode: 1916AnP . . . 354 . . . 769E, doi:10.1002/andp.19163540702, archived from the original (PDF) on Aug. 29, 2006, retrieved Feb. 14, 2016.

* cited by examiner

| | 1 | 2 | 3 | 4 | 5 |
|---|---|---|---|---|---|
| | 0 | 2 | 6 | 9 | 9 |
| | 2 | 0 | 5 | 9 | 7 |
| | 6 | 5 | 0 | 8 | 5 |
| | 9 | 9 | 8 | 0 | 3 |
| | 9 | 7 | 5 | 3 | 0 |

FIG. 8A

| | 1 | 2 | 3 | 4 | 5 |
|---|---|---|---|---|---|
| | 1 | 2 | 3 | 5 | 4 |
| | 2 | 1 | 3 | 5 | 4 |
| | 3 | 5 | 2 | 1 | 4 |
| | 4 | 5 | 3 | 1 | 2 |

FIG. 8B

| From/To: City | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| 1 | 0 | 44 | 135 | 207 | 199 | 21 | 27 | 140 | 186 | 107 | 61 | 63 | 25 | 174 | 98 | 94 | 213 | 116 | 66 | 174 | 41 | 147 |
| 2 | 44 | 0 | 111 | 190 | 164 | 84 | 1 | 38 | 120 | 54 | 68 | 136 | 138 | 80 | 16 | 64 | 127 | 206 | 78 | 159 | 230 | 198 |
| 3 | 135 | 111 | 0 | 173 | 119 | 34 | 2 | 153 | 70 | 200 | 194 | 160 | 89 | 39 | 224 | 131 | 80 | 6 | 32 | 126 | 106 | 192 |
| 4 | 207 | 190 | 173 | 0 | 70 | 38 | 87 | 104 | 203 | 48 | 5 | 194 | 170 | 152 | 158 | 158 | 109 | 230 | 170 | 17 | 231 | 144 |
| 5 | 199 | 164 | 119 | 70 | 0 | 229 | 123 | 81 | 168 | 180 | 87 | 168 | 141 | 114 | 35 | 175 | 86 | 132 | 193 | 101 | 22 | 167 |
| 6 | 21 | 84 | 34 | 38 | 229 | 0 | 132 | 13 | 221 | 195 | 21 | 112 | 132 | 14 | 203 | 167 | 196 | 11 | 164 | 46 | 145 | 131 |
| 7 | 27 | 1 | 2 | 87 | 123 | 132 | 0 | 140 | 0 | 231 | 157 | 47 | 83 | 162 | 190 | 110 | 73 | 123 | 139 | 161 | 21 | 87 |
| 8 | 140 | 38 | 153 | 104 | 81 | 13 | 140 | 0 | 125 | 231 | 13 | 172 | 35 | 117 | 135 | 28 | 45 | 195 | 58 | 101 | 216 | 42 |
| 9 | 186 | 120 | 70 | 203 | 168 | 221 | 214 | 125 | 0 | 141 | 2 | 108 | 52 | 34 | 44 | 85 | 63 | 145 | 33 | 53 | 11 | 128 |
| 10 | 107 | 54 | 200 | 48 | 180 | 195 | 231 | 231 | 141 | 0 | 213 | 106 | 98 | 41 | 193 | 8 | 69 | 152 | 14 | 134 | 207 | 209 |
| 11 | 61 | 68 | 194 | 5 | 87 | 21 | 157 | 13 | 2 | 213 | 0 | 220 | 186 | 32 | 189 | 8 | 119 | 171 | 45 | 207 | 67 | 56 |
| 12 | 63 | 136 | 160 | 194 | 168 | 112 | 47 | 172 | 108 | 106 | 220 | 0 | 119 | 209 | 110 | 119 | 171 | 45 | 187 | 123 | 67 | 56 |
| 13 | 25 | 138 | 89 | 170 | 141 | 132 | 83 | 35 | 52 | 98 | 186 | 119 | 0 | 160 | 36 | 153 | 131 | 195 | 197 | 145 | 52 | 43 |
| 14 | 174 | 80 | 39 | 152 | 114 | 14 | 162 | 117 | 34 | 41 | 32 | 209 | 160 | 0 | 160 | 98 | 45 | 28 | 48 | 37 | 178 | 140 |
| 15 | 98 | 16 | 224 | 158 | 35 | 203 | 190 | 135 | 44 | 193 | 189 | 110 | 36 | 160 | 0 | 116 | 28 | 195 | 26 | 116 | 95 | 162 |
| 16 | 94 | 64 | 131 | 158 | 175 | 167 | 110 | 28 | 85 | 8 | 8 | 119 | 153 | 98 | 116 | 0 | 24 | 172 | 24 | 116 | 46 | 135 |
| 17 | 213 | 127 | 80 | 109 | 86 | 196 | 73 | 105 | 63 | 228 | 69 | 171 | 131 | 45 | 176 | 194 | 0 | 72 | 3 | 161 | 0 | 18 |
| 18 | 116 | 206 | 6 | 230 | 132 | 11 | 123 | 45 | 195 | 145 | 152 | 45 | 195 | 28 | 25 | 172 | 72 | 0 | 26 | 214 | 104 | 114 |
| 19 | 66 | 78 | 32 | 170 | 193 | 164 | 139 | 173 | 58 | 33 | 14 | 187 | 197 | 145 | 26 | 25 | 3 | 26 | 0 | 44 | 140 | 18 |
| 20 | 174 | 159 | 126 | 17 | 101 | 46 | 161 | 67 | 101 | 53 | 134 | 123 | 145 | 37 | 128 | 223 | 161 | 214 | 44 | 0 | 108 | 171 |
| 21 | 41 | 230 | 106 | 231 | 22 | 145 | 21 | 101 | 216 | 11 | 207 | 67 | 52 | 178 | 95 | 46 | 145 | 140 | 104 | 108 | 0 | 141 |
| 22 | 147 | 198 | 192 | 144 | 167 | 131 | 87 | 42 | 171 | 128 | 209 | 56 | 43 | 140 | 162 | 135 | 81 | 114 | 18 | 171 | 141 | 0 |

FIG. 9A

| Order/City | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| 1 | 1 | 6 | 13 | 7 | 21 | 2 | 11 | 12 | 19 | 16 | 15 | 10 | 18 | 3 | 8 | 22 | 20 | 14 | 9 | 5 | 4 | 17 |
| 2 | 2 | 7 | 15 | 8 | 1 | 10 | 16 | 11 | 19 | 14 | 6 | 3 | 9 | 17 | 12 | 13 | 20 | 5 | 4 | 22 | 18 | 21 |
| 3 | 3 | 7 | 18 | 19 | 6 | 14 | 9 | 17 | 13 | 21 | 2 | 5 | 20 | 16 | 1 | 8 | 12 | 4 | 22 | 11 | 10 | 15 |
| 4 | 4 | 11 | 20 | 6 | 10 | 5 | 7 | 8 | 17 | 22 | 14 | 15 | 16 | 13 | 19 | 3 | 2 | 12 | 9 | 1 | 18 | 21 |
| 5 | 5 | 21 | 15 | 4 | 8 | 17 | 11 | 20 | 14 | 3 | 7 | 18 | 13 | 2 | 22 | 9 | 12 | 16 | 10 | 19 | 1 | 6 |
| 6 | 6 | 18 | 8 | 14 | 11 | 1 | 3 | 4 | 19 | 2 | 12 | 22 | 7 | 13 | 21 | 19 | 16 | 10 | 17 | 15 | 9 | 5 |
| 7 | 7 | 2 | 3 | 21 | 1 | 12 | 17 | 13 | 22 | 4 | 16 | 18 | 5 | 6 | 19 | 8 | 11 | 20 | 14 | 15 | 9 | 10 |
| 8 | 8 | 11 | 6 | 16 | 13 | 2 | 22 | 18 | 20 | 5 | 21 | 4 | 17 | 14 | 9 | 15 | 7 | 1 | 3 | 12 | 19 | 10 |
| 9 | 9 | 11 | 14 | 15 | 4 | 19 | 17 | 3 | 16 | 20 | 12 | 2 | 8 | 10 | 5 | 22 | 1 | 18 | 4 | 7 | 21 | 6 |
| 10 | 10 | 21 | 19 | 16 | 8 | 20 | 2 | 13 | 12 | 1 | 22 | 9 | 18 | 5 | 16 | 6 | 3 | 11 | 14 | 17 | 8 | 7 |
| 11 | 11 | 9 | 4 | 22 | 1 | 19 | 6 | 14 | 11 | 2 | 17 | 5 | 20 | 18 | 7 | 13 | 15 | 3 | 21 | 4 | 10 | 12 |
| 12 | 12 | 18 | 7 | 15 | 22 | 21 | 10 | 9 | 15 | 6 | 16 | 13 | 6 | 2 | 3 | 5 | 17 | 8 | 19 | 11 | 8 | 11 |
| 13 | 13 | 1 | 8 | 11 | 9 | 20 | 9 | 7 | 3 | 10 | 12 | 17 | 15 | 2 | 5 | 20 | 16 | 14 | 4 | 7 | 10 | 19 |
| 14 | 14 | 6 | 18 | 18 | 19 | 5 | 7 | 17 | 19 | 2 | 16 | 19 | 14 | 8 | 22 | 4 | 13 | 7 | 1 | 22 | 14 | 10 |
| 15 | 15 | 2 | 16 | 8 | 11 | 2 | 12 | 10 | 14 | 21 | 1 | 4 | 3 | 20 | 8 | 4 | 22 | 17 | 11 | 11 | 18 | 3 |
| 16 | 16 | 11 | 15 | 9 | 19 | 18 | 3 | 1 | 22 | 7 | 12 | 7 | 2 | 22 | 13 | 4 | 6 | 18 | 5 | 21 | 12 | 20 |
| 17 | 17 | 19 | 14 | 15 | 21 | 14 | 12 | 3 | 17 | 5 | 8 | 12 | 5 | 13 | 21 | 20 | 12 | 15 | 16 | 7 | 6 | 10 |
| 18 | 18 | 3 | 6 | 22 | 11 | 15 | 3 | 8 | 19 | 22 | 1 | 19 | 2 | 11 | 10 | 11 | 6 | 13 | 9 | 10 | 17 | 4 |
| 19 | 19 | 17 | 11 | 19 | 19 | 10 | 8 | 10 | 20 | 14 | 9 | 4 | 5 | 18 | 16 | 7 | 17 | 4 | 8 | 6 | 1 | 13 |
| 20 | 20 | 4 | 14 | 5 | 1 | 16 | 13 | 5 | 9 | 21 | 15 | 7 | 2 | 4 | 13 | 2 | 5 | 7 | 22 | 2 | 20 | 16 |
| 21 | 21 | 10 | 7 | 13 | 12 | 10 | 7 | 12 | 15 | 8 | 19 | 3 | 3 | 18 | 22 | 6 | 17 | 14 | 11 | 12 | 5 | 4 |
| 22 | 22 | 19 | 8 | 22 | 17 | 17 | 18 | 18 | 10 | 6 | 16 | 14 | 21 | 4 | 1 | 15 | 5 | 9 | 20 | 3 | 2 | 11 |

FIG. 9B

SOLVING NP-HARD PROBLEMS THROUGH HEURISTIC ACQUISITION AND REUSE

FEDERALLY-SPONSORED RESEARCH AND DEVELOPMENT

The United States Government has ownership rights in the subject matter of the present disclosure. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil. Reference Navy Case No. 103,687.

BACKGROUND OF THE INVENTION

Technical Field

The present disclosure technically relates to heuristic systems. Particularly, the present disclosure technically relates to heuristic systems for solving non-deterministic polynomial time-hard (NP-hard) problems.

Description of Related Art

In the related art computer science, artificial intelligence, mathematical optimization, a "heuristic" refers to a technique used for solving a problem more quickly when a conventional method is too slow, or for finding an approximate solution when a conventional method fails to find any exact solution. Optimality, completeness, accuracy, or precision, are traded for speed. A heuristic function, also called simply a "heuristic," is a function that ranks alternatives in search algorithms at each branching step that is based on available information to decide which branch to follow. For example, the heuristic may approximate the exact solution. A heuristic produces a solution in a reasonable time frame that is "sufficient enough" for solving the problem at hand, albeit the solution may not be the best of all actual solutions to the problem, or the solution may simply approximate the exact solution. Nonetheless, the heuristic solution may still be valuable as being more speedily obtained.

One of the major constraints in related art is that, while related art heuristics may produce results by themselves, may be used in conjunction with optimization programs to improve their efficiency, or may be used to generate seed values, related art heuristics are insufficiently self-referential and insufficiently self-randomizing. Therefore, a need exists for a heuristic system that is capable of solving a variety of NP-hard problems.

SUMMARY OF INVENTION

To address at least the needs in the related art, the present disclosure generally involves a computational system for solving a non-deterministic polynomial problem, the system comprising a parellel processor operable by a set of self-updatable executable instructions storable on a non-transient memory device and configuring the parallel processor to: interface with an information acquisition program; heuristically acquire information, through the information acquisition program, via a first transference and a second transference, whereby heuristic information is acquired; parametrically evolve the heuristic information, whereby parametrically evolved heuristic information is provided; reuse the parametrically evolved heuristic information to further heuristically acquire information, whereby iterative parametrically evolved heuristic information is provided; and self-update the set of executable instructions based on the iterative parametrically evolved heuristic information, whereby a self-updated set of executable instructions is provided; whereby the self-updated set of executable instructions facilitates information transfer between any two otherwise mutually random domains, and whereby an optimal solution, corresponding to the non-deterministic polynomial problem, is provided.

BRIEF DESCRIPTION OF THE DRAWINGS

The above, and other, aspects, features, and benefits of several embodiments of the present disclosure are further understood from the following Detailed Description of the Embodiment(s) as presented in conjunction with the following drawings.

FIG. 8A is a tabular diagram illustrating city traversal mileage (or equivalent thereof) for solving an NP-hard problem, e.g., a traveling salesperson problem (TSP), during commencing a first optimization phase, enhancements of which are achievable by way of the computational system and methods, in accordance with embodiments of the present disclosure.

FIG. 8B is a tabular diagram illustrating traversal mileage from a closest (left-most) city to a farthest city (right-most) for solving an NP-hard problem, e.g., a TSP, during commencing a first optimization phase, enhancements of which are achievable by way of the computational system and methods, in accordance with embodiments of the present disclosure.

FIG. 9A is a tabular diagram illustrating city traversal mileage (or equivalent thereof) for solving an NP-hard problem, e.g., a TSP during commencing a second optimization phase, enhancements of which are achievable by way of the computational system and methods, in accordance with embodiments of the present disclosure.

FIG. 9B is a tabular diagram illustrating traversal mileage from a closest (left-most) city to a farthest city (right-most) for solving an NP-hard problem, e.g., a TSP during commencing a second optimization phase, enhancements of which are achievable by way of the computational system and methods, in accordance with embodiments of the present disclosure.

Figure 1:
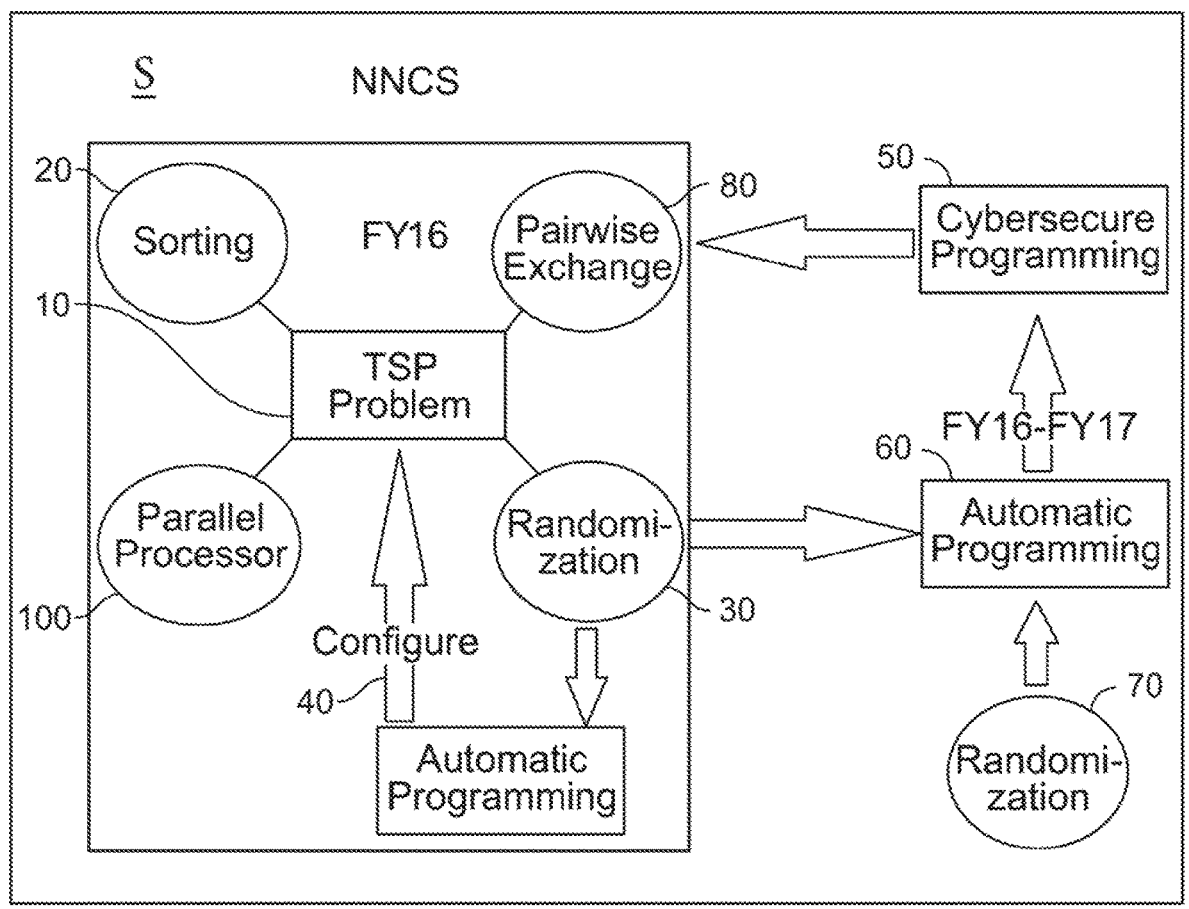
FIG. 1 is a schematic diagram illustrating a role of an NP-hard problem in relation to cyber-security and automatic programming, enhancements of which are achievable by way of the computational system and methods, in accordance with embodiments of the present disclosure.

Corresponding reference numerals or characters indicate corresponding components throughout the figures. Elements in the several figures are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood elements that are useful or necessary in commercially feasible embodiments are often not depicted in order to facilitate a less obstructed view of these various embodiments of the present disclosure.

DETAILED DESCRIPTION OF THE EMBODIMENT(S)

The present disclosure encompasses solutions for computational optimization, such as providing useful solution of NP-hard problems, e.g., a TSP, in tractable computation times. The solutions may include providing automatic heuristic information acquisition for their self-referential refinement, providing scaling for quantum computation, and adapting machine-learning in data acquisition. Accordingly, problems that involve constrained data sets may progressively evolve the heuristic information by scaling "up" the data set size; and, thus, solve, by transference, e.g., knowledge transference, similar problems. Thus, NP-hard problems are heuristically solvable, in accordance with embodiments of the present disclosure.

In accordance with some embodiments of present disclosure, the system and methods involve the use of at least intra-domain transference, e.g., as demonstrated for an "8-puzzle" example and a "15-puzzle" example, by using parametric evolution and reuse, wherein such parameters are considered an instance of the entire heuristic data structure without loss of generality, and wherein oscillatory feedback transfers heuristic knowledge from the "8-puzzle" up to the "15-puzzle" (a first transference) and back from the "15-puzzle" down to the "8-puzzle" (a second transference). Generally, some embodiments of present disclosure involve a schema-based instantiation, for the evolution and reuse of heuristics, as described in the following patent document, hereby incorporated by reference herein in its entirety: U.S. Pat. No. 9,436,912 entitled "Symmetric Schema Instantiation Method for use in a Case-Based Reasoning System".

In accordance with some embodiments of present disclosure, the systems and methods involve a first transference comprising heuristic extrapolation; and a second transference comprising dimensionality reduction. Both modalities of heuristic extrapolation and dimensionality reduction each comprise intra-domain transference and inter-domain transference, whereby stepwise heuristic transference is effected. The scope of transference and the complexity of problems being solvable is increased beyond that of related art approaches. Knowledge transfer between otherwise mutually random domains occurs. For example, if a function of complexity m has y points of variance, then the complexity of searching instances is expressed as the function $O(m^{**}y)$. This searching complexity function O of searching instances cannot be addressed by a linear number of processors, e.g., in the related art. However, by heuristically breaking the function into n parts, the searching complexity function O' can be expressed as $O'(n^*m^{**}y/n)$, whereby an effective exponential reduction in complexity is provided, and whereby knowledge amplification is provided. Moreover, the systems and methods consider that, from the results of a heuristic data or information acquisition, self-randomization is a relative and emergent property for randomization factors that exceed the given index thereof, wherein a fixed point is absent, wherein increasingly new data is continuously received, and wherein self-randomization is continuously performed, in accordance with embodiments of the present disclosure.

In accordance with some embodiments of present disclosure, the systems and methods further involve, but are not limited to, the following features: a solution for NP-hard problems in tractable time and tractable space; heuristic solutions having practical value for at least the reason that the quality difference between an optimal solution and a suboptimal solution is arbitrarily small while the difference in the time and space required to discover an optimal solution and a suboptimal solution is arbitrarily large; heuristic learning that can produce near-optimal solutions to logistics problems; learned heuristics for a near-optimal solution, e.g., for implementation in air logistics programs; heuristic learning, through diversity, for decreasing cost of otherwise implementing a partial solution to a cyber-security problem; heuristic learning mediated by transference and reuse; heuristics that are fully amenable to discovery by using a parallel search for the tractable solution of complex problems; solutions to problems that are more complex than those solvable by quantum computers; heuristic solutions for an NP-hard problem that is otherwise unable to use a $2^{}n$ search without incurring a linear bottleneck; empirical evidence supporting the Semantic Randomization Theorem (SRT); heuristic learning being intra-domain, whereby dimensional scaling is achievable; heuristic learning being inter-domain, whereby analogical learning is achievable; heuristic learning for scaling machine learning; heuristic learning that solves the failed Japanese Fifth Generation project which was built upon the predicate calculus lacking in heuristic evaluation by the "back-cut" mechanism; heuristic learning configurable in relation to the 8-puzzle and the 15-puzzle transfer problems; an order of magnitude speedup for an n-puzzle problem, wherein greater speedups occur through the use of more degrees of freedom, whereby the use of schemas, e.g., as described in the following patent document, as above-incorporated by reference herein in its entirety: U.S. Pat. No. 9,436,912 entitled "Symmetric Schema Instantiation Method for Use in a Case-Based Reasoning System", is facilitated; heuristic search spaces being specifiable by using schema-specification languages; a heuristic that is automatically instantiated through intra- and inter-domain transference, rather than requiring a human as otherwise needed in relation to schema-specification languages; heuristic learning accelerated through adaptive feedback; complex domains placed into stepwise symmetry through heuristic transference; heuristics configured to accelerate discovery of other heuristics, including themselves through feedback loops; heuristic learning that is capable of discovering infinitely new heuristics by at least the techniques of Albert Einstein's "Equivalence Principle" which considers equivalence between uniform acceleration, e.g., in an elevator, and standing in a gravitational field, e.g., as described in Albert Einstein's "Theory of General Relativity." Since light radiating into an elevator slightly drops by the time the light reaches the other side of the elevator, gravity is deemed to also bend light, e.g., "the equivalence." This "Equivalence Principle" is used to reduce a set of complex problems to another set of problems for which analysis is at least one of becoming simpler than that of the set of complex problems and becoming more revealing than that of the set of complex problems. Einstein, Albert (1916), "Die Grundlage der allgemeinen Relativitätstheorie," Annalen der Physik, 49: 769-822, Bibcode:1916AnP . . . 354 . . . 769E, doi:10.1002/andp.19163540702, archived from the original (PDF) on Aug. 29, 2006, retrieved Feb. 14, 2016, is hereby incorporated by reference in its entirety, wherein the complexity of such solutions is infinite, and wherein other techniques are combinable for discovering prime numbers; heuristic learning that enables a human user to concentrate on a project at the conceptual level, e.g., specifying schemas, while further enabling the machine to improve searching for a symbiotic solution; heuristic learning comprising a triangle inequality, wherein, if a function of complexity m has y points of variance, the complexity of searching instances is expressed as the function $O(m^{}y)$, otherwise unsolvable by a linear number of processors, and wherein, by heuristically breaking the searching complexity function into n parts, the complexity becomes $O'(n*m^{**}y/n)$ for an exponential reduction in complexity; heuristic learning that overcomes related art neural networks which are not symbolic and incapable of modus ponens; and heuristic learning that is "friendly" in relation to the manner in which humans learn language, thereby being more efficient than related art neural network models of human learning.

In accordance with some embodiments of the present disclosure, the computational system and methods may be applied to the Joint Air Logistics Information System (JALIS), by example only. JALIS is a multipurpose on-demand automated airlift scheduling program for use with Operational Support Aircraft (OSA) and Navy Unique Fleet Essential Aircraft (NUFEA). The JALIS program involves an airlift data collection and analysis system and methods for airlift and aircraft management. Through this program, airlift requesters can enter airlift requests and retrieve flight status information. The JALIS program also provides the airlift schedulers with a decision-support tool for developing efficient flight schedules based on the priority of requests and the availability of aircraft assets. The JALIS program also provides aircraft operators with an online tool for communicating the latest aircraft status, retrieving flight assignments, and entering post-mission reporting data. Airlift schedulers must work with "fuzzy" departure and arrival times for flights, match transportation needs with available cargo transports, evaluate refueling stops for updating the status of government contracts, e.g., monthly, in an effort to contain cost and the like. The computations system and methods of the present disclosure provide the solutions, e.g., for the JALIS system, that are flexible and adapted to change for new flight missions and other new requirements.

Another example of an NP-hard problem is the "traveling salesman problem" (TSP), one of the model problems in the field of computing optimization. If the optimal solution to the TSP is discoverable in polynomial time, then every NP-hard problem is solvable in polynomial time, e.g., by proving that the polynomial is equal to the nonlinear polynomial, e.g., P=NP. In accordance with embodiments of the present disclosure, the computational system and methods involve a set of self-updatable executable instructions, operable by at least one processor or computer and storable on a nontransient memory device. The set of self-updatable executable instructions comprises an instruction for discovering an optimal solution to an NP-hard problem, e.g., the TSP, by proving that the polynomial approximates the nonlinear polynomial, e.g., P~NP, with scaling. Using a "$\delta$-$\epsilon$" proof, as a number of cities approaches infinity, P approaches NP, e.g., $\delta > 0$. The system and methods of the present disclosure use a quadratic number of parallel processors for at least that speedup, e.g., computational acceleration, which is expressible by a polynomial. A fastest parallel instruction is defined; and six distinct three-dimensional (3-D) charts of empirical results are provided. For example, using an arbitrary run comprising approximately 5,000 cities, a tour is obtained within 0.00001063 percent of the optimal tour by using approximately 4,166,667 virtual processors, e.g., an Intel® Xenon® (both of which are trademarks of Intel Corporation or its subsidiaries in the U.S. and/or other countries) E5-1603 processor @ 2.8 GHz. To complete a calculation for saving the approximately 209 miles, a quantum computer, e.g., the fastest possible computer to date, requires over $(5,000!/(2^{**}4,978^*22!))^*267,782$ centuries. For at least this circumstance, the system and methods of the present disclosure involve the automated acquisition of heuristics and providing the associated P~NP solutions, whereby computational time is optimizable.

In accordance with embodiments of the present disclosure, the system and methods involve a cost-effective approach to cyber-security by way of automatic programming, even in the absence of deterministic feedback. Thus, equivalent semantics, selected at random, are cyber-secure, whereby all but purely, and inherently, random codes, e.g., the Mersenne Twister code, are protectable. In the present disclosure, a solution to the TSP problem involves highly efficient sorting and comparison with a random path for a first optimization stage, "Phase I." Alternatively, a comparison of two random "walks" may be elected, e.g., where a nearest-first solution is known not to be, or not expected to be, optimal, for Phase I. In a second optimization stage, "Phase II," a better solution, found in the previous phase, is iteratively improved by way of a pair-wise exchange. The self-updatable executable instructions are amenable to parallel processing and have already demonstrated an approximately 94% improvement over an intuitive nearest-first solution using random data which otherwise must be manually cyber-secured, whereby a user may attempt to infect an intuitive nearest-first solution and/or steal cycles. For at least this ramification, the system and methods of the present disclosure involve features for early detection of any cyber-attack.

In accordance with embodiments of the present disclosure, the methods comprise creating, programming, and automating semantic code variants, thereby minimizing the cost of cyber protection. The present methods use randomization-based cyber-secure symmetric automatic functional programming. Cyber-security and automatic programming, in general, are predicated on randomization. The present methods comprise using, abstract transformation, thereby entailing a heuristic search, and wherein heuristic searching is implemented by self-updatable executable instructions. For example, "red helium balloons" are relatable to "blue helium balloons" by way of a simple and direct transformation of color; however, the transformative relation between "helium balloons" and "hot air balloons" is a complex and abstract transformation for at least the reason that helium (He) comprises a density in a range that is less than that of air, e.g., He at room or ambient temperature and for at least that heated air, e.g., at an air temperature above room or ambient temperature is substitutable for He, e.g., He at room or ambient temperature. The P~NP problem is an example problem for use with the tractable automatic programming of the present disclosure. Thus, as the heuristic system increases in processing power, the cost of operation decreases. Accordingly, the near-optimal heuristic solution to the TSP problem can have enormous impact, in this regard, down the line.

Referring to FIG. 1, this schematic diagram illustrates a role of a computational system, such as the system S, and methods, such as the methods M1 (FIGS. 10A bad 10B) and M2 (FIG. 11), in solving an NP-hard problem, such as a "traveling salesman problem" (TSP), by example only, in relation to cyber-security and automatic programming, enhancements of which are achievable by way, in accordance with embodiments of the present disclosure. The core TSP is selected as an example for at least its intractable aspect which requires a heuristic solution and that such requirement renders the TSP difficult to cyber-secure by using related art methods.

Still referring to FIG. 1, in accordance with embodiments of the present disclosure, the system and methods are adaptable for preventing cyber-attacks by way of cyber-security features 50 and automatic programming features 60 (FIG. 1). The impact of the system and methods of the present disclosure extend beyond cyber-security, such as randomization-based cyber-security via a randomization feature 70 (FIG. 1), and comprises features that are adaptable for use with autonomous vehicles, fighting machines, configuration machines, and any other equipment requiring logistics management.

The Heuristic TSP Instruction

Still referring to FIG. 1, in accordance with embodiments of the present disclosure, the system and methods involve a recursively enumerable heuristic solution to the TSP problem that empirically demonstrates that a problem set being solvable in polynomial time approached that of a problem set being unsolvable in polynomial time, e.g., or P~NP. In relation to the TSP, a first query comprises: "Given a list of cities and the distances between each pair of cities, what is the shortest possible route that visits each city exactly once and returns to the origin city?" Although the problem is NP-complete, heuristic methods enable solutions to problems, even with millions of cities, to be approximated within a small fraction of 1 percent, e.g., within approximately 0.05% of the optimal solution for the world tour problem. For 5,000 cities, a tour solution is obtained within approximately 0.00001063% of the optimal tour. For many other instances, corresponding to millions of cities, solutions can be found within approximately 2% to approximately 3% percent of an optimal tour. Removing a condition of visiting each city "only once" does not remove the NP-hardness, for at least the reason that, in the planar case, an optimal tour exists that visits each city only once (otherwise, by the triangle inequality, a shortcut that skips a repeated visit would not increase the tour length).

Still referring to FIG. 1, in accordance with embodiments of the present disclosure, the system and methods involve reducing decision logic of the travelling salesman problem or for any problem in the NP class, whereby any executable instruction that closely solves the decision for the travelling salesman problem is transformable by an executable instruction that solves all other problems in the NP class. Thus, if a polynomial-time instruction is hypothetically developed for the decision travelling salesman problem, every problem in NP is also solvable in polynomial time, thereby proving that P=NP. However, a set of self-updatable executable instructions, as used in the system and methods of the present disclosure, more practically solve NP-hard problems by closely approximating polynomial to a nonlinear polynomial, e.g., P~NP, $\delta$>0 with scale, (FIGS. 2-9B).

Still referring to FIG. 1, in accordance with embodiments of the present disclosure, the system and methods involve initializing the number of cities, n, and populating the distances between each pair of cities at random, e.g., between [1, n*(n−1)/2] miles, corresponding to the number of undirected edges. The distance between an arbitrary pair of cities need not be unique. Some asymmetric duplication among the inter-city distances exacerbates the TSP problem by increasing its complexity in relation to a heuristic solution, whereby a minimum number, e.g., a "corner point," allows a distinct mileage assignment for each undirected edge. The system and methods of the present disclosure involve a sorting feature 20 (FIG. 1) that uses an iterative Quicksort logic for ordering the cities, wherein a test of approximately 1,000,000 random elements is sorted in approximately 156 milliseconds, wherein the Quicksort logic is configured to perform with random data, wherein computational speed is maximized, and wherein a first data array comprising a of size of less than approximately 17 are sorted using an insertion technique. The sorted information is used to order the inter-city distances from nearest to furthest in a second array (FIGS. 8A-9B). A starting city is randomly selected which will be deemed the same as a destination city. The nearest-first tour begins at the starting city and follows the path of minimal distance in the selection of each successive unvisited city. "Ties" are resolved by iterative optimization, e.g., in the second or heuristic phase.

Still referring to FIG. 1, in accordance with embodiments of the present disclosure, the system and methods involve testing visited cities in sequence from a nearest city to a farthest city. The nearest city not visited and previously visited cities are found by comparing city data that is stored at a vector position. If vector [position]=position, then city=position is deemed "visited;" however, if vector [position]≠position, then city≠position is deemed "not visited." The first column of data is skipped as it refers to the minimal distance, which is from a city to itself. Equidistant cities are resolved as first-in, first-out (FIFO) in Phase I and optimized in the Phase II. Visited cities are stored, in sequence, in a second vector. Upon conclusion, the residue, which comprises this second vector defines a random tour for purposes of comparison. That is, the nearest-first and random tours are compared; and the data for the shorter tour serves as initial data to iterate (or "initial iterate") the analysis of Phase II.

Still referring to FIG. 1, in accordance with embodiments of the present disclosure, the system and methods involve returning to the starting city and exiting the iterative loop, e.g., completing Phase I of the tour when all of the cities have been visited. Again, the best-found tour is initialized by the minimum of the random tour and the nearest-first tour. The second-best tour is set to the remaining tour. These assignments appear to be equally likely in the absence of characterizing knowledge. An option allows for the use of a second random tour in lieu of the nearest-first tour. This option is faster and is to be selected whenever a nearest-first tour is known to be suboptimal, e.g., when the cities are not arranged in a manner of the equidistant "end-spokes," e.g., on a bicycle wheel. Selecting a good initial iterate in Phase I accelerates the solution to the TSP in Phase II.

Still referring to FIG. 1, in accordance with embodiments of the present disclosure, the required time to find an optimal solution can be estimated from n! tours based on the known time that it takes to do m tours, wherein m<<n!, thereby allowing much larger TSP problems to be estimated for optimality than could otherwise be searched by related art methods. In the system and methods of the present disclosure, the computational time period for finding an optimal tour of approximately 8 cities runs approximately 16 seconds, which approximates the time period for running a strictly random heuristic search for a tour of 700 cities. Such search is based on n=8 nested for loops running on one Intel Xenon E5-1603 chip @ 2.8 GHz. Random searching provides a better estimate of the optimal solution, wherein the solution space is much larger than can be explored for at least the reason that random searching uniformly samples the solution space. The optimal tour is based on the cyber-secure differential, e.g., the optimal tour is expected to be the minimal percentage improvement between the pairs of iteratively-improved tours better than the best-found tour. If the distinct second-best tour covers the same distance as the best-found tour, then the tours are said to be optimal. These tours are discovered using heuristic (subinterval) optimization as such tours would be otherwise intractable. Notable is that the identity, $\log 2\ x = (\log 10\ x)/(\log 10\ 2)$, wherein the bases and x are positive real numbers, and wherein the bases are not equal to one, is used for calculations.

Still referring to FIG. 1, the system of the present disclosure is configured to iterate, without yielding an improved tour, for a defined time or number of iterations, wherein approximately five million iterations is appropriate for approximately 5,000 cities, or equivalently approximately 1,000*|cities|, whereby the tour distance is reduced by approximately 94% over the tour distance from Phase I. The boundary defined time or number of iterations is configured using non-deterministic logarithmic (NL) instructions for exploration. A starting and ending city are randomly selected from [1, |cities−1|], wherein the starting and goal city are immutable. The entrance and exit distances, for the pair of cities, are subtracted from the best tour distance. The random pair of cities is swapped, e.g., pair-wise exchanged; and the entrance and exit distances, for the swapped pair of cities, are added to the best tour distance to replace the subtracted distances, such as determined via a pair-wise exchange feature 80 (FIG. 1). If the resulting tour covers less distance, a new next-best tour and best tour are saved. Otherwise, the swap is reversed to restore the evaluation vector for the best found tour so far; and, the process of swapping cities begins anew. Relaxation techniques are not generally faster than this feature of the present system.

Still referring to FIG. 1, in accordance with embodiments of the present disclosure, the capability for iterative parallel heuristic optimization, wherein random pair-wise exchanges and comparisons use semaphore protection for two groups of three-contiguous cities with corresponding data blocks, or six cities at a time. However, the overhead associated with assigning, tracking, and releasing these data blocks will approximately double the swap time. Given, n cities, this single-instruction, multiple-data (SIMD) speedup is thus given as [n/(2×6)]. Thus, for approximately 120 cities, for example, up to approximately 20 SIMD processors facilitate speedup by a factor of ten. A multiple-instruction, multiple-data (MIMD) speedup is included in assertion to the SIMD speedup in embodiments of the present disclosure. Here, up to n! parallel processors (or n parallel processors) independently solve the problem, wherein the overhead occurs in communicating the best solution found with the other parallel processors. This communication overhead is expressed as the function O(n). Thus, the MIMD speedup will be a factor of n−1 times. Statistical redundancy is given by n!/2(n−2)!. Given approximately 5,000 cities, only one in approximately 12,497,500 pair-wise exchanges will be redundant as a result, which is insignificant. Combining SIMD and MIMD speedups, using $[n^2/6]$ parallel processors, the maximum realistic parallel speedup is [n(n−1)/12], which is the function $O(n^2)$. The use of more parallel processors can further reduce the run time, but with ever-decreasing efficiency.

Still referring to FIG. 1, in accordance with embodiments of the present disclosure, in relation to the cyber-security feature, the small subinterval problems are run by using the same diverse semantically equivalent instructions as for the larger intervals. However, the selected random order of cities is passed to semantically diverse instructions to check cyber-security as the sub-problems arise, e.g., different codes must produce identical outputs as is the case with Quicksort logic and insertion sort logic, by example only. The symmetric half of these instructions is automatically programmable. For at least the reason that executing the symmetric half of these instructions potentially consume up to approximately half of the computational resources, the system and methods of the present disclosure tractably check cyber-security at defined frequent intervals. The minimum and maximum subinterval sizes are parameterized and configured by using a "natural" language, whereby the automatic programming feature for automatic symmetric programming, is operational on a small scale as well. Generally, as the interval decreases, the likelihood of finding an optimization increases, e.g., down to some minimal block size, and reliability of the cyber-security increases, e.g., for at least the reason that checks for cyber-attacks are proportionately more frequent.

Still referring to FIG. 1, a computational system S for solving at least one non-deterministic polynomial problem 10, comprises at least one parallel processor 100 operable by a set of self-updatable executable instructions storable on a non-transient memory device (not shown) and configuring the at least one parallel processor 100 to: interface with an information acquisition program (not shown), such as the JALIS program and/or a cyber-security program; heuristically acquire information, through the information acquisition program (not shown), e.g., via sorting module 20, via a first transference (not shown) and a second transference (not shown), whereby heuristic information is acquired; parametrically evolve the heuristic information, whereby parametrically evolved heuristic information is provided; reuse the parametrically evolved heuristic information to further heuristically acquire information, whereby iterative parametrically evolved heuristic information is provided; and self-update the set of executable instructions based on the iterative parametrically evolved heuristic information, as shown by arrow 30, whereby a self-updated set of executable instructions is provided, e.g., for iterative reuse, as indicated by arrow 40, whereby the self-updated set of executable instructions facilitates information transfer between any two otherwise mutually random domains, and whereby at least one optimal solution, corresponding to the at least one non-deterministic polynomial problem, is provided.

Still referring to FIG. 1, the set of self-updatable executable instructions comprises instructions to heuristically extrapolate data from the heuristic information during the first transference and to dimensionally reduce data from the heuristic information during the second transference. The instruction to heuristically acquire information comprises an instruction to perform the first transference and an instruction to perform the second transference. Each of the instructions to perform the first transference and the instruction to perform the second transference comprises an instruction to perform an intra-domain transference and an instruction to perform an inter-domain transference, whereby analogical learning is achieved and a stepwise heuristic transference is effected. The instruction to parametrically evolve the heuristic information comprises an instruction to consider any instance of the heuristically acquired information.

Still referring to FIG. 1, the instruction to perform the first transference comprises an instruction to oscillate feedback of heuristically acquired information from a b-puzzle to c-puzzle; and the instruction to perform the second transference comprises an instruction to oscillate feedback of heuristically acquired information from the c-puzzle to the b-puzzle, wherein c comprises a value greater than b. The instruction to parametrically evolve the heuristic information comprises an instruction to instantiate the heuristic information based on schema; and the instruction to reuse the parametrically evolved heuristic information comprises an instruction to instantiate the heuristic information based on schema.

Still referring to FIG. 1, if a complexity function m comprises y points of variance, a searching complexity function, corresponding to a plurality of instances, is expressible as $O(m^{}y)$, the instruction to heuristically acquire information comprises an instruction to heuristically deconstruct the searching complexity function $O(m^{}y)$ into n parts for facilitating the stepwise heuristic transference, whereby a deconstructed searching complexity function O' is expressible as $O'(n^*m^{}y/n)$, whereby an effective exponential reduction in complexity facilitates knowledge amplification, and whereby the searching complexity function O' facilitates configuring the at least one parallel processor 100** to heuristically acquire information otherwise unsearchable by a plurality of linear processors (not shown). The instruction to self-update the set of executable instructions, based on the iterative parametrically evolved heuristic information, comprises an instruction to continuously self-randomize the searching complexity function O' in the absence of any fixed point in at least one of tractable cyberspace and tractable time, whereby increasingly new heuristic information is continuously acquired.

Still referring to FIG. 1, the instruction to interface with an information acquisition program comprises an instruction to interface with at least one of an air logistics program (not shown) and a cyber-security program (not shown). The instruction to self-update the set of executable instructions further comprises at least one instruction to: scale machine-learning based on the iterative parametrically evolved heuristic information, whereby machine-learning is reconfigured to search for a symbiotic solution; specify an heuristic search-space by using a schema-specification language; automatically instantiate heuristic data via the intra-domain transference and the inter-domain transference; accelerate heuristic learning via adaptive feedback; place a complex domain into a stepwise symmetry via heuristic transference; configure the heuristic learning to accelerate discovery of other heuristic information, the other heuristic information comprising the heuristic learning itself via at least one feedback loop; configure the heuristic learning to infinitely discover infinitely new heuristic information via a technique based on an equivalence principle; and configure the heuristic learning to use a triangle inequality technique.

Example TSP Results

Graphic Presentation Examples

Referring ahead to FIGS. 2-7, these graphical diagrams illustrate the results of running the above set of instructions based on symmetric automatic heuristic programming on different hardware substrates, whereby heuristic optimization and parallel hardware are enhanced and may be suitable for implementations that extend far beyond the confines of optimization, and even cyber-security. To begin operation of the system S, factors that are compared are at least one of: the time taken for the heuristic and optimal tours running on the Intel Xenon E5-1603 chip @ 2.8 GHz, the time taken for a parallel machine based on the number of cities running the heuristic and optimal tours, and the time taken for a quantum computer based on the number of cities, e.g., a $2^n$ theoretical speedup, which will be practically reduced, running the optimal tour, thereby showing that P~NP. The computed distances from optimality are also shown in FIGS. 2-7. Notable is that quantum computers may be configurable to factor large numbers, which is not possible using heuristic methods. Furthermore, $n!/2-(n/2)!\times[(n-1)/2]!$, wherein $3.5!=3.5\times2.5\times1.5\times0.5$.

Figure 2:
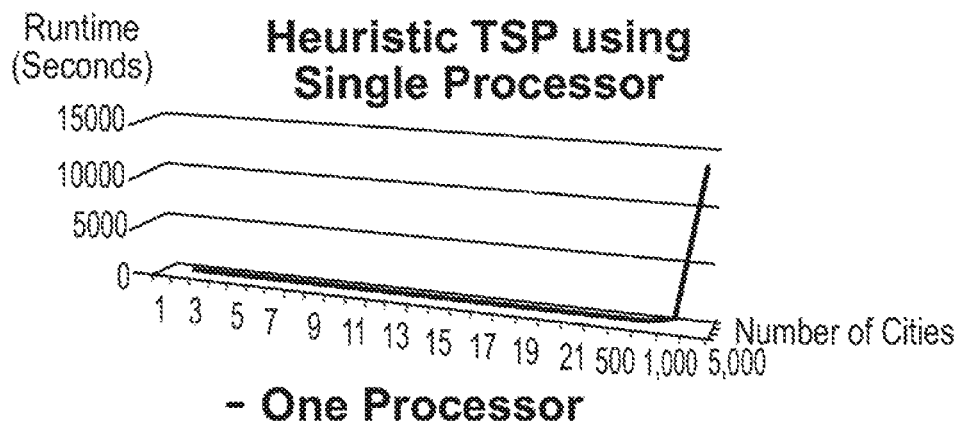
FIG. 2 is a graphic diagram illustrating heuristic run times for solving an NP-hard problem by a single processor, enhancements to which are achievable by way of the computational system and methods, in accordance with embodiments of the present disclosure.

Referring to FIG. 2, this graphic diagram illustrates heuristic run times for solving an NP-hard problem, such as a TSP, by example only, by a single processor, enhancements to which are achievable by way of the computational system S and methods M1 and M2, in accordance with embodiments of the present disclosure. The run times for the foregoing instruction using an Intel Xenon E5-1603 chip @ 2.8 GHz are shown. These run times are on the order of approximately 2 seconds for up to approximately 100 cities. It then jumps to approximately 42 seconds for approximately 500 cities, approximately 291 seconds for approximately 1,000 cities, and approximately 13,710 seconds for approximately 5,000 cities. This characteristic quadratic climb in run times can be completely offset including a quadratic number of processors on an approximate order. However, since such a large number of processors is not always practical, an instruction may be included to relax the optimality requirements from a small fraction of approximately 1% to approximately a few percent, or by any combination thereof. Still, for only approximately 17 cities, computing will require approximately 3.705075 E+10 times as long to compute the optimal tour as would computing the heuristic tour on the same machine. For at least this circumstance, the system S utilizes a set of self-updatable executable instructions for applying heuristic techniques.

Figure 3:
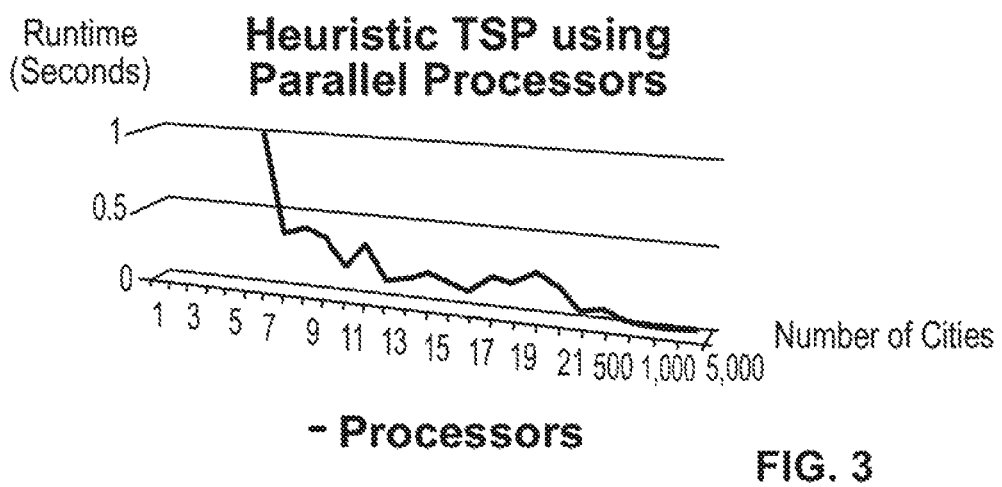
FIG. 3 is a graphic diagram illustrating heuristic run times for solving an NP-hard problem by a parallel processor, enhancements of which are achievable by way of the computational system and methods, in accordance with embodiments of the present disclosure.

Referring to FIG. 3, this graphic diagram illustrates heuristic run times for solving an NP-hard problem, such as a TSP, by example only, by a parallel processor, enhancements of which are achievable by way of the computational system S and methods M1 and M2, in accordance with embodiments of the present disclosure. The run times required by the foregoing instruction running on a (massively parallel) collection of virtual Intel Xenon E5-1603 chips @ 2.8 GHz are shown. These run times are on the order of approximately half a second by using approximately 6 processors for approximately 6 cities, approximately half a second using approximately 9 processors for approximately 7 cities, approximately $\frac{1}{8}^{th}$ of a second using approximately 17 processors for approximately 10 cities, approximately $\frac{1}{12}^{th}$ of a second using approximately 38 processors for approximately 15 cities, approximately $\frac{1}{50}^{th}$ of a second using approximately 81 processors for approximately 22 cities, approximately $\frac{1}{500}^{th}$ of a second using approximately 1,667 processors for approximately 100 cities, approximately $\frac{1}{2,000}^{th}$ of a second using approximately 41,667 processors for approximately 500 cities, approximately $\frac{1}{600}^{th}$ of a second using approximately 166,667 processors for approximately 1,000 cities, and approximately $\frac{1}{150}^{th}$ of a second using approximately 4,166,667 processors for approximately 5,000 cities. The run time non-uniformly goes towards zero as the number of processors grows quadratically as defined by the number of cities.

Figure 4:
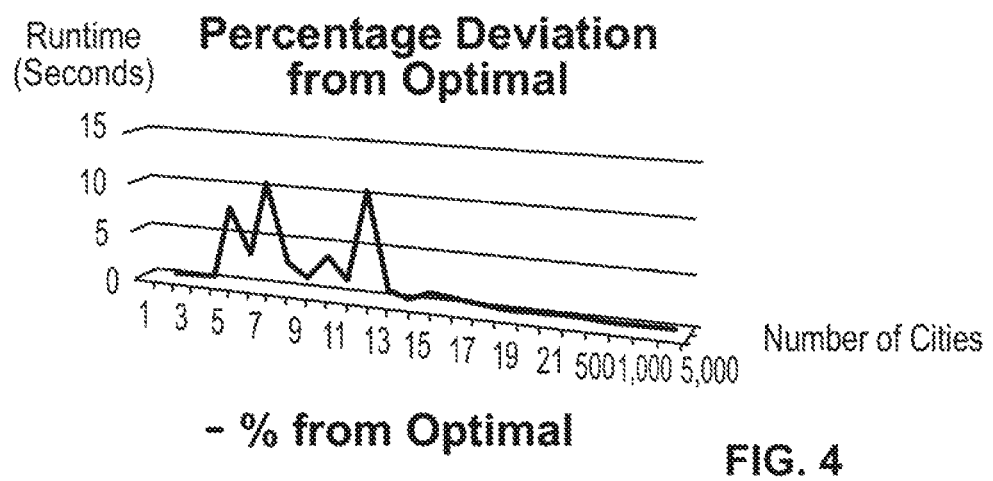
FIG. 4 is a graphic diagram illustrating optimized heuristic run times for solving an NP-hard problem, enhancements of which are achievable by way of the computational system and methods, in accordance with embodiments of the present disclosure.

Referring to FIG. 4, this graphic diagram illustrates optimized heuristic run times for solving an NP-hard problem, such as a TSP, by example only, enhancements of which are achievable by way of the computational system S and methods M1 and M2, in accordance with embodiments of the present disclosure. As the number of cities increases, the heuristic solution converges on the increasingly near-optimal solution. Even in this example, using a heuristic technique is not practical for single processors as the number of cities grows without bound, whereby using parallel processors is practical, which can grow quadratically as a function of the number of cities. Again, the set of self-updatable executable instructions allows optimality to be sacrificed for the sake of tractability if a sufficient number of processors is not available. The deviation from optimal solution is approximately 7.7% for approximately 5 cities, approximately 10.42% for approximately 7 cities, approximately 3.4% for approximately 10 cities, approximately 0.9% for approximately 15 cities, approximately 0.09% for approximately 22 cities, approximately 0.01% for approximately 100 cities, approximately 0.0009% for approximately 500 cities, approximately 0.00007% for approximately 1,000 cities, and approximately 0.00001% for approximately 5,000 cities.

Figure 5:
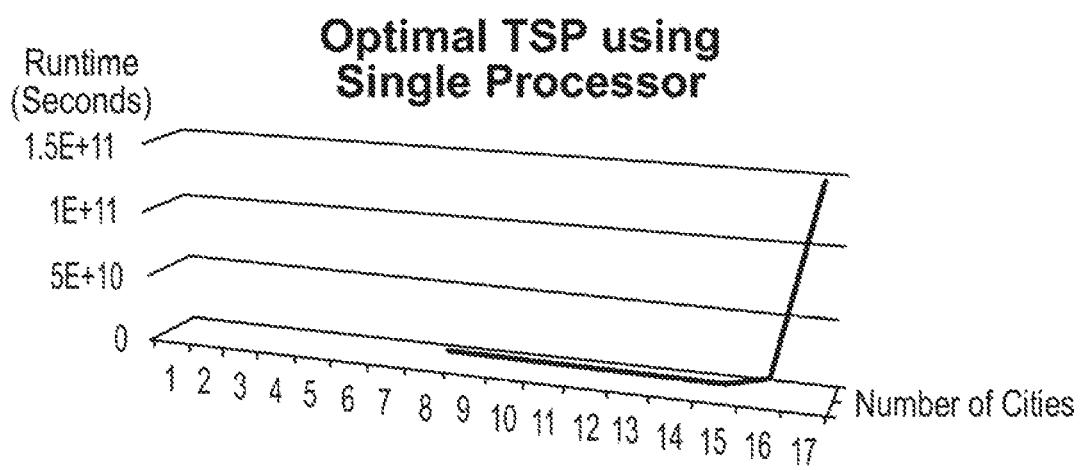
FIG. 5 is a graphic diagram illustrating optimized heuristic run times for solving an NP-hard problem by a single processor, enhancements of which are achievable by way of the computational system and methods, in accordance with embodiments of the present disclosure.

Referring to FIG. 5, this graphic diagram illustrates optimized heuristic run times for solving an NP-hard problem, such as a TSP, by example only, by a single processor, enhancements of which are achievable by way of the computational system S and methods M1 and M2, in accordance with embodiments of the present disclosure. The run times required by the function O(n!) optimal algorithm running on an Intel Xenon E5-1603 chip @ 2.8 GHz. The run time is approximately 16 seconds for approximately 8 cities, approximately 151 seconds for approximately 9 cities, approximately 1,512 seconds for approximately 10 cities, approximately 16,632 seconds for approximately 11 cities, approximately 199,584 seconds for approximately 12 cities, approximately 2,594,592 seconds for approximately 13 cities, approximately 36,324,288 seconds for approximately 14 cities, approximately 544,864,320 seconds for approximately 15 cities, approximately 5,564,229,120 seconds for approximately 16 cities, approximately 1.48203 E+11 seconds for approximately 17 cities, and approximately (5,000!/20!)*321,445 centuries, approximately 6 years, and approximately 334 days to compute for approximately 5,000 cities. This characteristic exponential climb in run times can only be offset by relaxing the optimality requirements from a small fraction of one percent to say a few percent.

Figure 6:
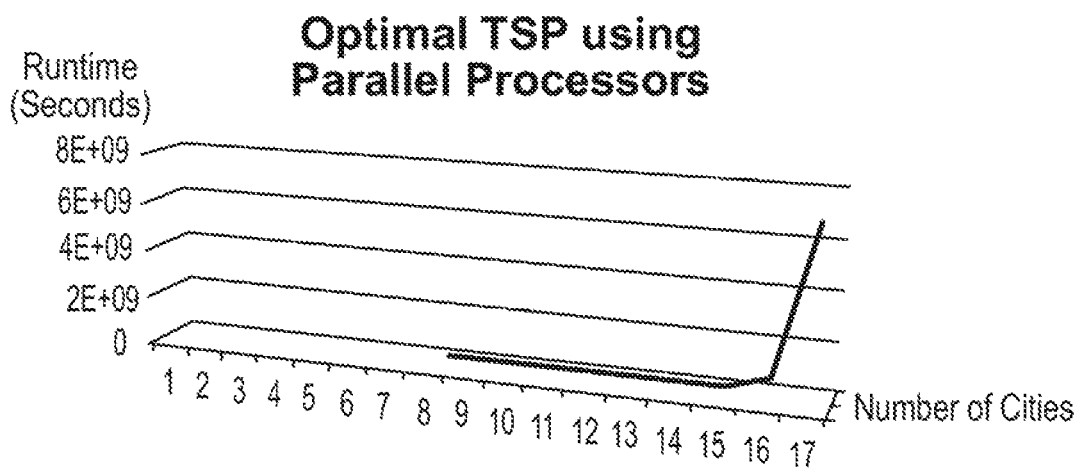
FIG. 6 is a graphic diagram illustrating optimized heuristic run times for solving an NP-hard problem by a parallel processor, enhancements of which are achievable by way of the computational system and methods, in accordance with embodiments of the present disclosure.

Referring to FIG. 6, this graphic diagram illustrates optimized heuristic run times for solving an NP-hard problem, such as a TSP, by example only, by a parallel processor, enhancements of which are achievable by way of the computational system S and methods M1 and M2, in accordance with embodiments of the present disclosure. FIG. 6 presents run times required by the O (n!) optimal algorithm running on a (massively parallel) collection of virtual Intel Xenon E5-1603 chips @ 2.8 GHz. The run time is approximately 4 seconds using approximately 11 processors for approximately 8 cities, approximately 25 seconds using approximately 14 processors for approximately 9 cities, approximately 216 seconds using approximately 17 processors for approximately 10 cities, approximately 1,848 seconds using approximately 21 processors for approximately 11 cities, 18,144 seconds using approximately 24 processors for approximately 12 cities, approximately 199,584 seconds using approximately 29 processors for approximately 13 cities, approximately 2,421,619 seconds using approximately 33 processors for approximately 14 cities, approximately 32,050,842 seconds using approximately 38 processors for approximately 15 cities, approximately 435,891,456 seconds using approximately 43 processors for approximately 16 cities, approximately 6,736,504,320 seconds using approximately 49 processors for approximately 17 cities, and approximately (5,000!/20!)*15 years, approximately 157 days, approximately 20 hours, approximately 18 minutes, and approximately 12 seconds to compute using approximately 4,166,667 processors for approximately 5,000 cities. While the run time is less by a factor of approximately 22 by using parallel processors for approximately 17 cities and by a factor of approximately 2,082,933 using parallel processors for approximately 5,000 cities, the factor, nonetheless, increases exponentially with the number of cities.

Figure 7:
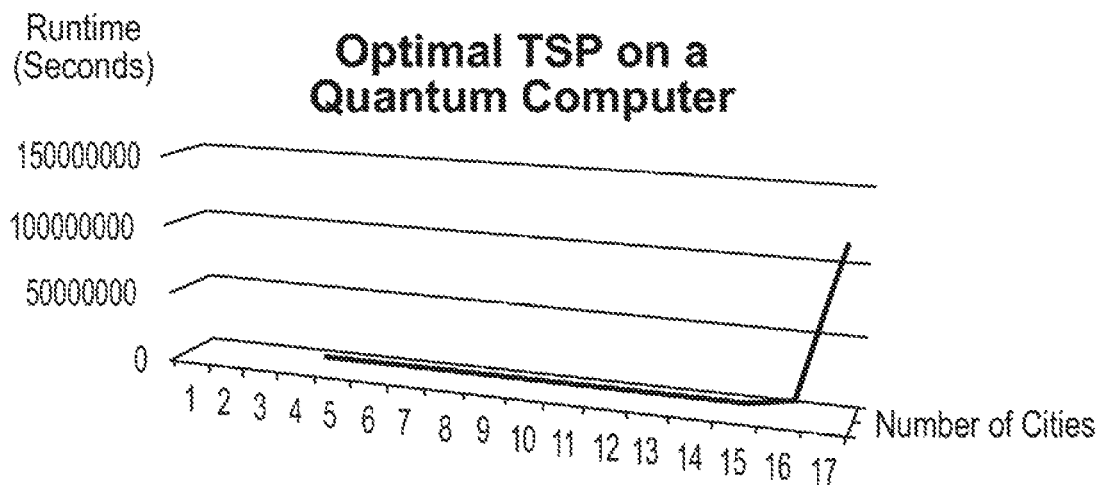
FIG. 7 is a graphic diagram illustrating optimized heuristic run times for solving an NP-hard problem by a quantum computer, enhancements of which are achievable by way of the computational system and methods, in accordance with embodiments of the present disclosure.

Referring to FIG. 7, this graphic diagram illustrates optimized heuristic run times for solving an NP-hard problem, such as a TSP, by example only, by a quantum computer, enhancements of which are achievable by way of the computational system S and methods M1 and M2, in accordance with embodiments of the present disclosure. Run times required by the O (n!) optimal algorithm running on a quantum computer are shown wherein the number of qbits equals the number of cities, theoretically. The run time is less than approximately 1 second for less than approximately 10 cities, approximately 5 seconds for approximately 10 cities, approximately 37 seconds for approximately 11 cities, approximately 309 seconds for approximately 12 cities, approximately 3,014 seconds for approximately 13 cities, approximately 34,286 seconds for approximately 14 cities, approximately 450,013 for approximately 15 cities, approximately 6,750,204 seconds for approximately 16 cities, approximately 114,753,474 seconds for approximately 17 cities, and approximately (5,000!/(2**4,978*22!))*267,782 centuries, approximately 20 years, approximately 269 days, approximately 7 hours, approximately 6 minutes, and approximately 41 seconds to compute for approximately 5,000 cities. While the run time is less by a factor of approximately 59 than for parallel processors for approximately 17 cities and by a factor of >>approximately 1.0 E+99 using an approximately 5,000-qbit quantum computer for approximately 5,000 cities, the factor, nonetheless, increases exponentially with the number of cities.

Five-City Tour Example

Referring ahead to FIGS. 8A and 8B, an example of determine solutions for a five-city tour in a TSP may commence with example text as follows:

Fri Feb 12 08:10:25 2016
WELCOME TO THE CYBER SECURE AMERICAN
AUTOMATED HEURISTIC TRAVELING SALESMAN
Enter the number of distinct cities (i.e., between 2 and 5,000)
?5
The tour will be comprised of 5 distinct cities numbered from 1 to 5.
Without loss of generality, the distance between the arbitrary pairs of 5 distinct cities is set to randomly vary between 1 and 10 miles (or equivalent).
The starting and ending city will be city number 1.
Referring to FIG. 8A, this a tabular diagram illustrating city traversal mileage (or equivalent thereof) for solving an NP-hard problem, such as a TSP, by example only, during commencing a first optimization phase, enhancements of which are achievable by way of the computational system S and methods M1 and M2, in accordance with embodiments of the present disclosure. Phase I proceeds with example text as follows:
STARTING PHASE I OPTIMIZATION:
CITY TRAVERSAL MILEAGE (OR EQUIVALENT)
The distance covered by the Phase I nearest-first tour is 24 miles.
The distance covered by the Phase I random tour is 30 miles.
The Phase I nearest-first tour covers the minimal distance.
The nearest-first tour covers 80 percent of the distance covered by the random tour.
Referring to FIG. 8B, this tabular diagram illustrates traversal mileage from a closest (left-most) city to a farthest city (right-most) for solving an NP-hard problem, such as a TSP, by example only, during commencing a first optimization phase, enhancements of which are achievable by way of the computational system S and methods M1 and M2, in accordance with embodiments of the present disclosure. Phase II proceeds with example text as follows:
STARTING PHASE II ITERATIVE OPTIMIZATION:
Fri Feb 12 08:10:28 2016
The optimized tour of city numbers follows from left to right.
{START, 1, 2, 3, 5, 4, 1, GOAL}
The distance covered by the optimized tour is 24 miles.
Phase II optimization was not able to improve upon the results of Phase I.
The optimized tour is predicted to be an optimal tour.
This completes the tour of 5 cities.
On this computer, the heuristic optimization of the TSP for a 5-city tour took 2 seconds to compute.
Using this algorithm, an optimal 5-city tour, on a 5-qbit quantum computer, will take 12.50000000 millisecond(s) to compute.

Twenty-Two-City Tour Example

Referring ahead to FIGS. 9A and 9B, an example of determined solutions for a five-city tour in a TSP may commence with example text as follows:
Fri Feb 12 08:14:31 2016
WELCOME TO THE CYBER SECURE AMERICAN
AUTOMATED HEURISTIC TRAVELING SALESMAN
Enter the number of distinct cities (i.e., between 2 and 5,000)
? 22
The tour will be comprised of 22 distinct cities numbered from 1 to 22.
Without loss of generality, the distance between the arbitrary pairs of 22 distinct cities is set to randomly vary between 1 and 231 miles (or equivalent).
The starting and ending city will be city number 1
Referring to FIG. 9A, this tabular diagram illustrates city traversal mileage (or equivalent thereof) for solving an NP-hard problem, such as a TSP, by example only, during commencing a second optimization phase, enhancements of which are achievable by way of the computational system S and methods M1 and M2, in accordance with embodiments of the present disclosure. Phase I proceeds with example text as follows:
STARTING PHASE I OPTIMIZATION:
The distance covered by the Phase I nearest-first tour is 2,303 miles.
The distance covered by the Phase I random tour is 2,571 miles.
The Phase I nearest-first tour covers the minimal distance.
The nearest-first tour covers 90 percent of the distance covered by the random tour.
Referring to FIG. 9B, this tabular diagram illustrates traversal mileage from a closest (left-most) city to a farthest city (right-most) for solving an NP-hard problem, such as a TSP, by example only, during commencing a second optimization phase, enhancements of which are achievable by way of the computational system S and methods M1 and M2, in accordance with embodiments of the present disclosure. Phase II proceeds with example text as follows:
STARTING PHASE II ITERATIVE OPTIMIZATION:
Fri Feb 12 08:14:33 2016
The distance covered by the iteratively optimized tour is 2,223 miles.
This iteration reduced the tour distance by 3.47372992 percent.
Fri Feb 12 08:14:33 2016
The distance covered by the iteratively optimized tour is 2,013 miles.
This iteration reduced the tour distance by 9.44669366 percent.
Fri Feb 12 08:14:33 2016
The distance covered by the iteratively optimized tour is 1,831 miles.
This iteration reduced the tour distance by 9.04123199 percent.
Fri Feb 12 08:14:33 2016
The distance covered by the iteratively optimized tour is 1,778 miles.
This iteration reduced the tour distance by 2.89459312 percent.
Fri Feb 12 08:14:33 2016
The distance covered by the iteratively optimized tour is 1,590 miles.
This iteration reduced the tour distance by 10.57367829 percent.
Fri Feb 12 08:14:33 2016
The distance covered by the iteratively optimized tour is 1,519 miles.
This iteration reduced the tour distance by 4.46540881 percent.
Fri Feb 12 08:14:33 2016
The distance covered by the iteratively optimized tour is 1,449 miles.
This iteration reduced the tour distance by 4.60829493 percent.
Fri Feb 12 08:14:33 2016
The distance covered by the iteratively optimized tour is 1,434 miles.

This iteration reduced the tour distance by 1.03519669 percent.
Fri Feb 12 08:14:33 2016
The distance covered by the iteratively optimized tour is 1,396 miles.
This iteration reduced the tour distance by 2.64993026 percent.
Fri Feb 12 08:14:33 2016
The distance covered by the iteratively optimized tour is 1,211 miles.
This iteration reduced the tour distance by 13.25214900 percent.
Fri Feb 12 08:14:33 2016
The distance covered by the iteratively optimized tour 1,160 miles.
This iteration reduced the tour distance by 4.21139554 percent.
Fri Feb 12 08:14:33 2016
The distance covered by the iteratively optimized tour is 1,056 miles.
This iteration reduced the tour distance by 8.96551724 percent.
Fri Feb 12 08:14:33 2016
The distance covered by the iteratively optimized tour is 1,030 miles.
This iteration reduced the tour distance by 2.46212121 percent.
Fri Feb 12 08:14:33 2016
The distance covered by the iteratively optimized tour is 906 miles.
This iteration reduced the tour distance by 12.03883495 percent.
Fri Feb 12 08:14:33 2016
The distance covered by the iteratively optimized tour is 857 miles.
This iteration reduced the tour distance by 5.40838852 percent.
Fri Feb 12 08:14:33 2016
The optimized tour of city numbers follows from left to right.
{START, 1, 12, 2, 7, 21, 5, 15, 9, 11, 16, 8, 13, 3, 18, 19, 22, 17, 14, 20, 10, 4, 6, 1, GOAL}
The distance covered by the optimized tour is 857 miles.
The Phase I tour was optimized by 63 percent in Phase II.
The optimal tour is predicted to be 1.03519669 percent better, or 848 miles.
That represents a potential improvement of 9 miles.
This completes the tour of 22 cities.
Referring to FIGS. 9A and 9B, on this example computer, e.g., Intel Xeon CPU-E5-1603, 2.80-GHz, 16.0, 64-bit operating system (OS), 16-GB random-access memory (RAM), the heuristic optimization of the TSP for a 22-city tour took, approximately 1 second to compute. Using 81 processors, the run time for this heuristic tour of 22 cities will take 48.94736842 milliseconds to compute. On a related art computer, an optimal 22-city tour, of the TSP, will take (22!/20!)*321,445 centuries, 6 years, and 334 days to compute. Using 81 processors on a related art computer, the run time for an optimal tour of 22 cities will take (22!/20!)*8,459 centuries, 8 years, and 28 days to compute. Using a related art algorithm, an optimal 22-city tour, on a 22-qbit quantum computer, will take 267,782 centuries, 20 years, 269 days, 7 hours, 6 minutes, and 41 seconds to compute.

Figure 10:
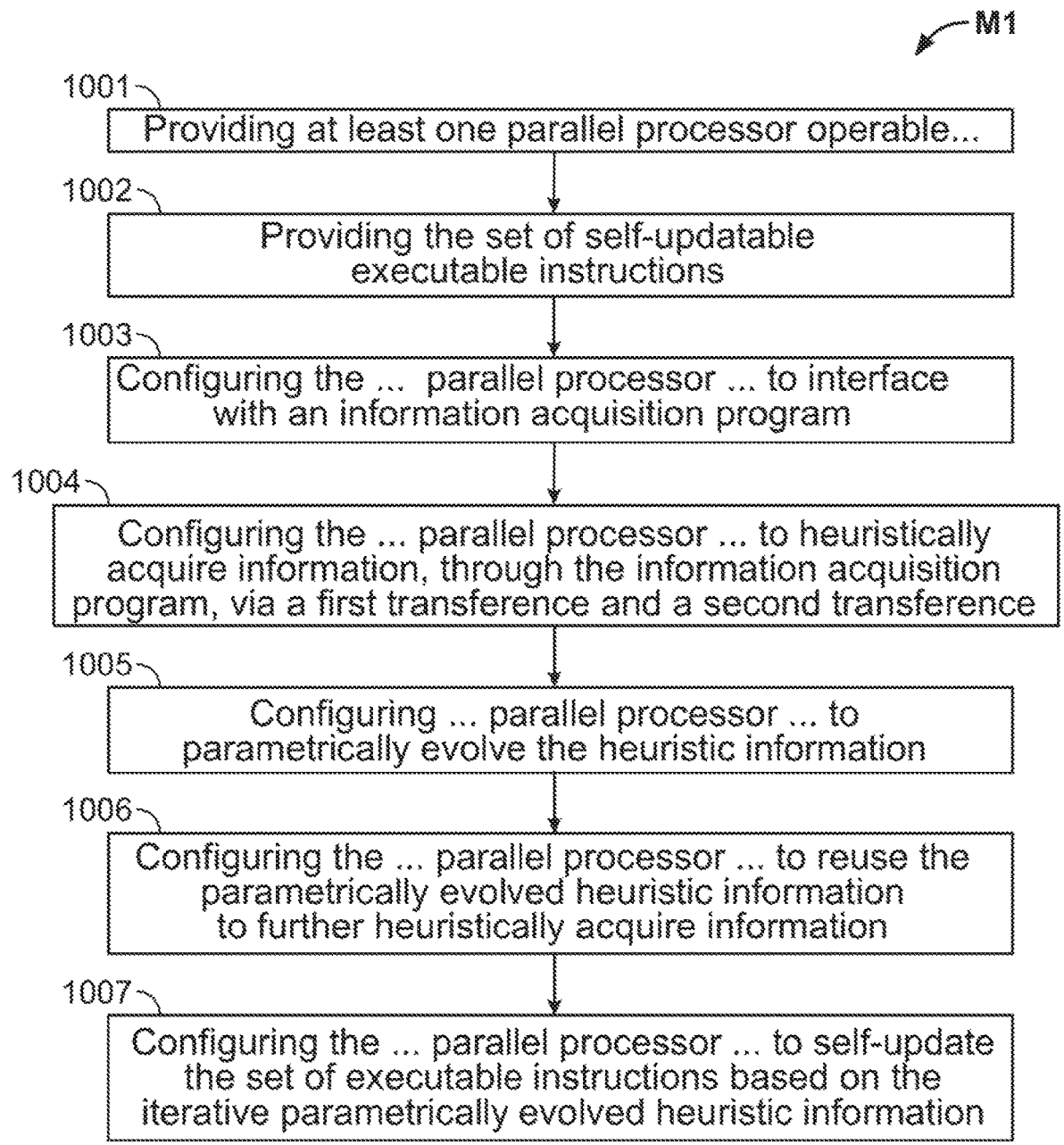
FIG. 10 is a flow diagram illustrating a method of fabricating a computational system for solving an NP-hard problem, enhancements of which are achievable, in accordance with an embodiment of the present disclosure.

Referring to FIG. 10, this flow diagram illustrates a method M1 of fabricating a computational system S for solving at least one non-deterministic polynomial problem, such as an NP-hard problem, in accordance with an embodiment of the present disclosure. The method M1 comprises: providing at least one parallel processor operable, as indicated by block 1001; providing the set of self-updatable executable instructions, as indicated by block 1002; and configuring the at least one parallel processor with the set of self-updatable executable instructions to: interface with an information acquisition program, as indicated by block 1003; heuristically acquire information, through the information acquisition program, via a first transference and a second transference, whereby heuristic information is acquired, as indicated by block 1004; parametrically evolve the heuristic information, whereby parametrically evolved heuristic information is provided, as indicated by block 1005; reuse the parametrically evolved heuristic information to further heuristically acquire information, whereby iterative parametrically evolved heuristic information is provided, as indicated by block 1006; and self-update the set of executable instructions based on the iterative parametrically evolved heuristic information, whereby a self-updated set of executable instructions is provided, as indicated by block 1007, whereby the self-updated set of executable instructions facilitates information transfer between any two otherwise mutually random domains, and whereby at least one optimal solution, corresponding to the at least one non-deterministic polynomial problem, is provided.

Still referring to FIG. 10, in the method M1, providing the set of self-updatable executable instructions, as indicated by block 1002, comprises providing instructions to heuristically extrapolate data from the heuristic information during the first transference and to dimensionally reduce data from the heuristic information during the second transference, providing the instruction to heuristically acquire information, as indicated by block 1004, comprises providing an instruction to perform the first transference, and providing an instruction to perform the second transference, wherein each of providing the instruction to perform the first transference, and providing the instruction to perform the second transference comprises providing an instruction to perform an intra-domain transference and providing an instruction to perform an inter-domain transference, and whereby analogical learning is achieved and a stepwise heuristic transference is effected.

Still referring to FIG. 10, in the method M1, providing the instruction to parametrically evolve the heuristic information, as indicated by block 1005, comprises providing an instruction to consider any instance of the heuristically acquired information, providing the instruction to perform the first transference comprises providing an instruction to oscillate feedback of heuristically acquired information from a b-puzzle to c-puzzle, wherein providing the instruction to perform the second transference, comprises providing an instruction to oscillate feedback of heuristically acquired information from the c-puzzle to the b-puzzle, and wherein c comprises a value greater than b, providing the instruction to parametrically evolve the heuristic information, as indicated by block 1005, comprises providing an instruction to instantiate the heuristic information based on schema, and providing the instruction to reuse the parametrically evolved heuristic information, as indicated by block 1006, comprises providing an instruction to instantiate the heuristic information based on schema.

Still referring to FIG. 10B, in the method M1, if a complexity function m comprises y points of variance, a searching complexity function, corresponding to a plurality of instances, is expressible as $O(my)$, providing the instruction to heuristically acquire information, as indicated by block 1004, comprises providing an instruction to heuristically deconstruct the searching complexity function $O(m^{}y)$ into n parts for facilitating the stepwise heuristic transference, whereby a deconstructed searching complexity function $O'$ is expressible as $O'(n^*m^{**}y/n)$, and whereby an effective exponential reduction in complexity facilitates knowledge amplification, and whereby the searching complexity function $O'$ facilitates configuring the at least one processor to heuristically acquire information otherwise unsearchable by a plurality of linear processors, providing the instruction to self-update the set of executable instructions, based on the iterative parametrically evolved heuristic information, comprises providing an instruction to continuously self-randomize the searching complexity function $O'$ in the absence of any fixed point in at least one of tractable cyberspace and tractable time, whereby increasingly new heuristic information is continuously acquired.

Still referring to FIG. 10, in the method M1, providing the instruction to interface with an information acquisition program, as indicated by block 1003, comprises providing an instruction to interface with at least one of an air logistics program and a cyber-security program; and providing the instruction to self-update the set of executable instructions, as indicated by block 1007, further comprises providing at least one instruction to: scale machine-learning based on the iterative parametrically evolved heuristic information, whereby machine-learning is reconfigured to search for a symbiotic solution; specify an heuristic search-space by using a schema-specification language; automatically instantiate heuristic data via the intra-domain transference and the inter-domain transference; accelerate heuristic learning via adaptive feedback; place a complex domain into a stepwise symmetry via heuristic transference; configure the heuristic learning to accelerate discovery of other heuristic information, the other heuristic information comprising the heuristic learning itself via at least one feedback loop; configure the heuristic learning to infinitely discover infinitely new heuristic information via a technique based on an equivalence principle; and configure the heuristic learning to use a triangle inequality technique.

Figure 11:
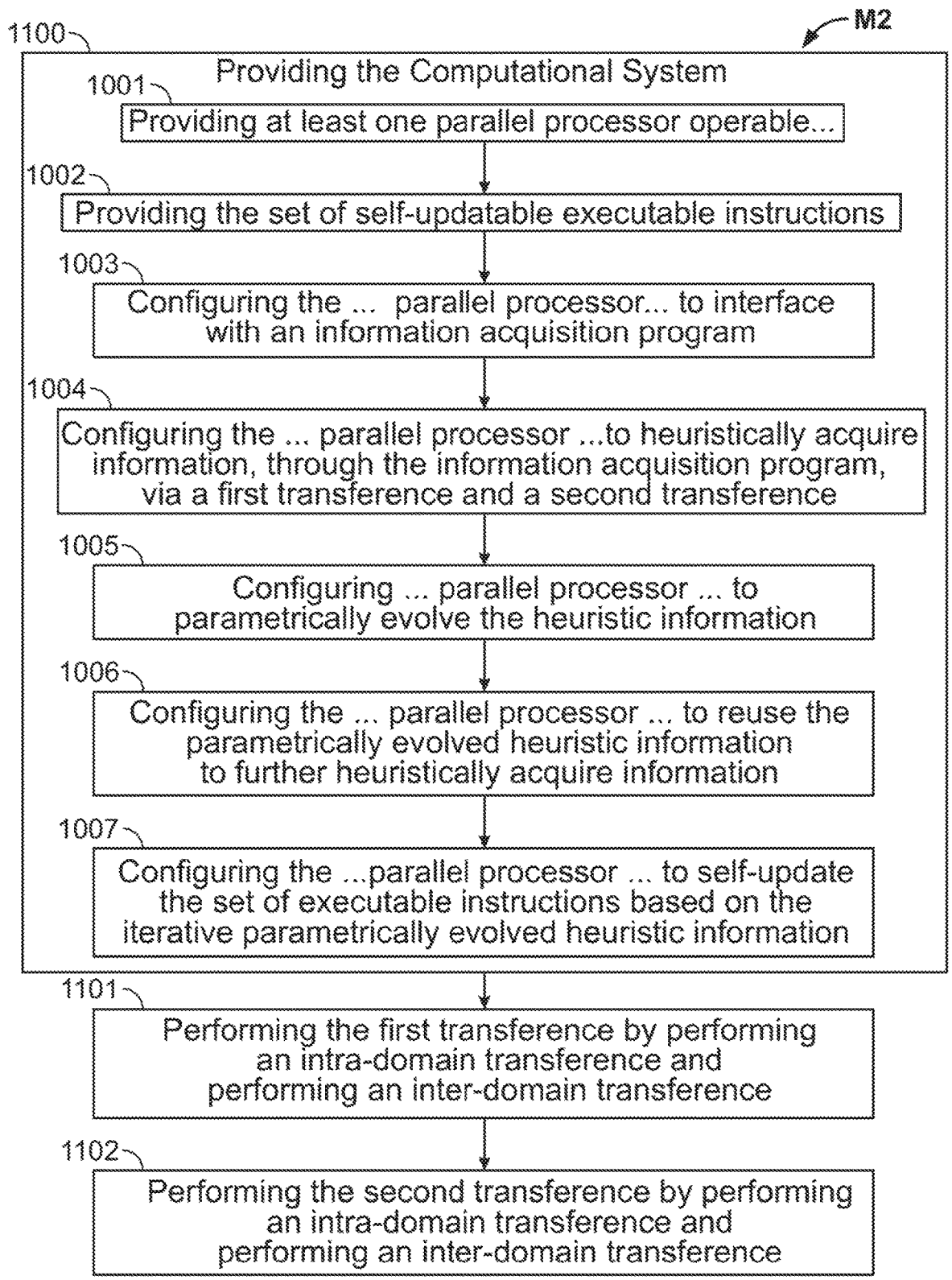
FIG. 11 is a flow diagram illustrating a method of solving an NP-hard problem by way of a computational system, enhancements of which are achievable, in accordance with an embodiment of the present disclosure.

Referring to FIG. 11, is a flow diagram illustrating a method M2 of solving at least one non-deterministic polynomial problem by way of a computational system, in accordance with an embodiment of the present disclosure. The method M2 comprises: providing the computational system, as indicated by block 1100, comprising providing at least one parallel processor operable, as indicated by block 1001; providing the set of self-updatable executable instructions, as indicated by block 1002; and configuring the at least one parallel processor with the set of self-updatable executable instructions to: interface with an information acquisition program, as indicated by block 1003; heuristically acquire information, through the information acquisition program, via a first transference and a second transference, whereby heuristic information is acquired, as indicated by block 1004; parametrically evolve the heuristic information, whereby parametrically evolved heuristic information is provided, as indicated by block 1005; reuse the parametrically evolved heuristic information to further heuristically acquire information, whereby iterative parametrically evolved heuristic information is provided, as indicated by block 1006; and self-update the set of executable instructions based on the iterative parametrically evolved heuristic information, whereby a self-updated set of executable instructions is provided, as indicated by block 1007, whereby the self-updated set of executable instructions facilitates information transfer between any two otherwise mutually random domains, and whereby at least one optimal solution, corresponding to the at least one non-deterministic polynomial problem, is provided; performing the first transference by performing an intra-domain transference and performing an inter-domain transference, thereby heuristically extrapolating data from the heuristic information, as indicated by block 1101; and performing the second transference by performing an intra-domain transference and performing an inter-domain transference, thereby dimensionally reducing data from the heuristic information, as indicated by block 1102, thereby achieving analogical learning and effecting a stepwise heuristic transference, thereby facilitating information transfer between any two otherwise mutually random domains by way of the self-updated set of executable instructions, and thereby providing at least one optimal solution corresponding to the at least one non-deterministic polynomial problem.

Referring back to FIGS. 1-11, running the set of self-updatable instructions for up to 5,000 cities, the Phase I tour is optimized in a range of up to approximately 94% in Phase II, such as within 0.00001063% of optimal, e.g., 209 miles. Accordingly, in decreasing order of likelihood, (a) pair-wise exchange cannot globally optimize the TSP solutions, e.g., each of two adjacent pair-wise exchanges increases the global distance slightly, but, taken together, the two adjacent pair-wise exchanges would reduce the global distance. (However, finding such ordered pairs, ordered triplets, and so on is clearly intractable for exponentially diminishing returns. Hence, (c) follows.), (b) the random number generator has an abbreviated period and/or is not uniform, and/or (c) P=NP, wherein P is quadratic, and wherein the scale tends towards infinity. For embodiments of the present disclosure, solving the problem comprises approaching arbitrarily close to, but not necessarily at, the optimal solution. While quadratic time is not practical for all applications, quadratic time opens the door for automatic program synthesis through heuristic search and discovery—something of enormous practical import.

Still referring back to FIGS. 1-11, the system and methods of the present disclosure involve their own alternatives. Heuristics depend on at least one of the order of preference for that which is being optimized, the scale of the problem, and, to a lesser extent, on the processing power. For example, a heuristic for the solution of a 20-city traveling salesman problem may not be suitable for the solution of a 200-city traveling salesman problem. Nevertheless, the former heuristic(s) can serve as a springboard for the evolution of the latter heuristic(s). Then too, a heuristic(s) for the solution of the larger problem may not take advantage of the additional search power available for the solution of the smaller problem. For the traveling salesman problem, if optimality of the tour is relaxed by just one percent, that which is not solvable by a supercomputer may be solvable by a personal computer (PC) in a matter of minutes. Given that the present disclosure involves methods for automated heuristic data acquisition, through reuse and transference, many more problems become amenable to heuristic solution, which were not solvable in any meaningful way in the related art.

It is understood is that many additional changes in the details, materials, steps and arrangement of parts, which have been herein described and illustrated to explain the nature of the invention, may be made by those skilled in the art within the principle and scope of the invention as expressed in the appended claims.

What is claimed:

1. A computational system for solving at least one non-deterministic polynomial problem, comprising at least one parallel processor operable by a set of self-updatable executable instructions storable on a non-transient memory device and configuring the at least one parallel processor to:

interface with an information acquisition program;

heuristically acquire information, through the information acquisition program, via a first transference from a first domain having a first dimensionality to a second domain having a second dimensionality and a second transference from the second domain having the second dimensionality, whereby heuristic information is acquired;

parametrically evolve the heuristic information, whereby parametrically evolved heuristic information is provided;

reuse the parametrically evolved heuristic information to further heuristically acquire information, whereby iterative parametrically evolved heuristic information is provided; and self-update the set of executable instructions based on the iterative parametrically evolved heuristic information, whereby a self-updated set of executable instructions is provided, whereby the self-updated set of executable instructions facilitates information transfer between the first and second domains that are mutually random domains either because the first and second domains differ such that the first transference is an inter-domain transference, or because the first and second domains are the same except for the first and second dimensionalities differing such that the first transference is an intra-domain transference, and whereby at least one optimal solution, corresponding to the at least one non-deterministic polynomial problem, is provided.

2. The system of claim 1, wherein the set of self-updatable executable instructions comprises instructions to heuristically extrapolate data from the heuristic information during the first transference, which is the intra-domain transference from the first domain to the second domain that are the same except that the second dimensionality is greater than the first dimensionality, and to dimensionally reduce data from the heuristic information during the second transference, which is another intra-domain transference from the second domain back to the first domain that are the same except that the first dimensionality is less that the second dimensionality.

3. The system of claim 1,
wherein the instruction to heuristically acquire information, comprises an instruction to perform the first transference and an instruction to perform the second transference,
wherein each of the instruction to perform the first transference and the instruction to perform the second transference are selected from the group consisting of an instruction to perform an intra-domain transference and an instruction to perform an inter-domain transference, and
whereby analogical learning is achieved and a stepwise heuristic transference is effected.

4. The system of claim 3,
wherein the instruction to perform the first transference comprises an instruction to perform an intra-domain transference that oscillates feedback of heuristically acquired information from the first domain of a b-puzzle to the second domain of a c-puzzle,
wherein the instruction to perform the second transference comprises an instruction to perform an intra-domain transference that oscillates feedback of heuristically acquired information from the second domain of the c-puzzle back to the first domain of the b-puzzle, and
wherein the second dimensionality c of the second domain comprises a value is greater than the first dimensionality b of the first domain.

5. The system of claim 1, wherein the instruction to parametrically evolve the heuristic information comprises an instruction to consider any instance of the heuristically acquired information.

6. The system of claim 1,
wherein the instruction to parametrically evolve the heuristic information comprises an instruction to instantiate the heuristic information based on schema, and
the instruction to reuse the parametrically evolved heuristic information comprises an instruction to instantiate the heuristic information based on schema.

7. The system of claim 1,
wherein, if a complexity function m comprises y points of variance, a searching complexity function, corresponding to a plurality of instances, is expressible as $O(m^{}y)$, the instruction to heuristically acquire information comprises an instruction to heuristically deconstruct the searching complexity function $O(m^{}y)$ into n parts for facilitating the stepwise heuristic transference, whereby a deconstructed searching complexity function $O'$ is expressible as $O'(n*m^{**}y/n)$, and
whereby an effective exponential reduction in complexity facilitates knowledge amplification, and whereby the searching complexity function $O'$ facilitates configuring the at least one processor to heuristically acquire information otherwise unsearchable by a plurality of linear processors.

8. The system of claim 7,
wherein the instruction to self-update the set of executable instructions, based on the iterative parametrically evolved heuristic information, comprises an instruction to continuously self-randomize the searching complexity function $O'$ in an absence of any fixed point in at least one of tractable cyberspace and tractable time, and
whereby increasingly new heuristic information is continuously acquired.

9. The system of claim 1, wherein the instruction to interface with an information acquisition program comprises an instruction to interface with at least one of an air logistics program and a cyber-security program.

10. The system of claim 1, wherein the instruction to self-update the set of executable instructions further comprises at least one instruction to:

scale machine learning based on the iterative parametrically evolved heuristic information, whereby machine learning is reconfigured to search for a symbiotic solution;

specify a heuristic search-space by using a schema-specification language;

automatically instantiate heuristic data via the intra-domain transference and the inter-domain transference;

accelerate heuristic learning via adaptive feedback;

place a complex domain into a stepwise symmetry via heuristic transference;

configure the heuristic learning to accelerate discovery of other heuristic information, the other heuristic information comprising the heuristic learning itself via at least one feedback loop;

configure the heuristic learning to infinitely discover infinitely new heuristic information via a technique based on an equivalence principle; and configure the heuristic learning to use a triangle inequality technique.

11. The method of claim 1,
wherein, if a complexity function m comprises y points of variance, a searching complexity function, corresponding to a plurality of instances, is expressible as O(my), providing the instruction to heuristically acquire information comprises providing an instruction to heuristically deconstruct the searching complexity function O(my) into n parts for facilitating the stepwise heuristic transference, whereby a deconstructed searching complexity function O' is expressible as O'(n*m**y/n), and
whereby an effective exponential reduction in complexity facilitates knowledge amplification, and whereby the searching complexity function O' facilitates configuring the at least one processor to heuristically acquire information otherwise unsearchable by a plurality of linear processors.

12. The method of claim 11,
wherein providing the instruction to self-update the set of executable instructions, based on the iterative parametrically evolved heuristic information, comprises providing an instruction to continuously self-randomize the searching complexity function O' in an absence of any fixed point in at least one of tractable cyberspace and tractable time, and
whereby increasingly new heuristic information is continuously acquired.

13. A method of fabricating a computational system for solving at least one non-deterministic polynomial problem, comprising:
providing at least one parallel processor operable by a set of self-updatable executable instructions storable on a non-transient memory device;
providing the set of self-updatable executable instructions; and
configuring the at least one parallel processor with the set of self-updatable executable instructions to:
interface with an information acquisition program;
heuristically acquire information, through the information acquisition program, via a first transference from a first domain having a first dimensionality to a second domain having a second dimensionality and a second transference from the second domain having the second dimensionality, whereby heuristic information is acquired;
parametrically evolve the heuristic information, whereby parametrically evolved heuristic information is provided;
reuse the parametrically evolved heuristic information to further heuristically acquire information, whereby iterative parametrically evolved heuristic information is provided; and
self-update the set of executable instructions based on the iterative parametrically evolved heuristic information, whereby a self-updated set of executable instructions is provided,
whereby the self-updated set of executable instructions facilitates information transfer between the first and second domains that are mutually random domains either because the first and second domains differ such that the first transference is an inter-domain transference, or because the first and second domains are the same except for the first and second dimensionalities differing such that the first transference is an intra-domain transference, and whereby at least one optimal solution, corresponding to the at least one non-deterministic polynomial problem, is provided.

14. The method of claim 13, wherein providing the set of self-updatable executable instructions comprises providing instructions to heuristically extrapolate data from the heuristic information during the first transference, which is the intra-domain transference from the first domain to the second domain that are the same except that the second dimensionality is greater than the first dimensionality and to dimensionally reduce data from the heuristic information during the second transference, which is another intra-domain transference from the second domain back to the first domain that are the same except that the first dimensionality is less that the second dimensionality.

15. The method of claim 13,
wherein providing the instruction to heuristically acquire information, comprises providing an instruction to perform the first transference and an instruction to perform the second transference,
wherein each of providing the instruction to perform the first transference and providing the instruction to perform the second transference comprises are selected from the group consisting of providing an instruction to perform an intra-domain transference and providing an instruction to perform an inter-domain transference, and
whereby analogical learning is achieved and a stepwise heuristic transference is effected.

16. The method of claim 15,
wherein providing the instruction to perform the first transference comprises providing an instruction to perform an intra-domain transference that oscillates feedback of heuristically acquired information from the first domain of a b-puzzle to the second domain of a c-puzzle,
wherein providing the instruction to perform the second transference comprises providing an instruction to perform an intra-domain transference that oscillates feedback of heuristically acquired information from the second domain of the c-puzzle back to the first domain of the b-puzzle, and
wherein the second dimensionality c of the second domain is greater than the first dimensionality b of the first domain.

17. The method of claim 13, wherein providing the instruction to parametrically evolve the heuristic information comprises providing an instruction to consider any instance of the heuristically acquired information.

18. The method of claim 13,
wherein providing the instruction to parametrically evolve the heuristic information comprises providing an instruction to instantiate the heuristic information based on schema, and
wherein providing the instruction to reuse the parametrically evolved heuristic information comprises providing an instruction to instantiate the heuristic information based on schema.

19. The method of claim 13,
wherein providing the instruction to interface with an information acquisition program comprises providing an instruction to interface with at least one of an air logistics program and a cyber-security program, and
wherein providing the instruction to self-update the set of executable instructions further comprises providing at least one instruction to:

scale machine learning based on the iterative parametrically evolved heuristic information, whereby machine learning is reconfigured to search for a symbiotic solution;

specify a heuristic search-space by using a schema-specification language;

automatically instantiate heuristic data via the intra-domain transference and the inter-domain transference;

accelerate heuristic learning via adaptive feedback;

place a complex domain into a stepwise symmetry via heuristic transference;

configure the heuristic learning to accelerate discovery of other heuristic information, the other heuristic information comprising the heuristic learning itself via at least one feedback loop;

configure the heuristic learning to infinitely discover infinitely new heuristic information via a technique based on an equivalence principle; and configure the heuristic learning to use a triangle inequality technique.

20. A method of solving at least one non-deterministic polynomial problem by way of computational system, comprising:

providing the computational system comprising providing at least one parallel processor operable by a set of self-updatable executable instructions storable on a non-transient memory device, providing the set of self-updatable executable instructions, and configuring the at least one parallel processor with the set of self-updatable executable instructions to: interface with an information acquisition program; heuristically acquire information, through the information acquisition program, via a first transference and a second transference, whereby heuristic information is acquired; parametrically evolve the heuristic information, whereby parametrically evolved heuristic information is provided; reuse the parametrically evolved heuristic information to further heuristically acquire information, whereby iterative parametrically evolved heuristic information is provided; and self-update the set of executable instructions based on the iterative parametrically evolved heuristic information, whereby a self-updated set of executable instructions is provided;

performing the first transference by performing an intra-domain transference and performing an inter-domain transference, thereby heuristically extrapolating data from the heuristic information; and performing the second transference by performing an intra-domain transference and performing an inter-domain transference, thereby dimensionally reducing data from the heuristic information, thereby achieving analogical learning and effecting a stepwise heuristic transference, thereby facilitating information transfer between any two otherwise mutually random domains by way of the self-updated set of executable instructions, and thereby providing at least one optimal solution corresponding to the at least one non-deterministic polynomial problem.

* * * * *